United States Patent [19]

Green

[11] Patent Number: 5,488,846
[45] Date of Patent: Feb. 6, 1996

[54] VEHICLE SECURITY DEVICE

[76] Inventor: Paul Green, Rose Cottage, Cronton Road, Tarbock Prescot, Merseyside, L35 1QY, England

[21] Appl. No.: 26,485

[22] Filed: Mar. 4, 1993

[51] Int. Cl.⁶ ................................................. B60R 25/06
[52] U.S. Cl. ................................................. 70/247; 70/248
[58] Field of Search ........................... 70/198–203, 210, 70/237, 238, 247, 248, 252, 245

[56] References Cited

U.S. PATENT DOCUMENTS

| | | | |
|---|---|---|---|
| 1,525,993 | 2/1925 | Hurd | 70/247 |
| 1,645,192 | 10/1927 | Hunt | 70/247 X |
| 1,657,517 | 1/1928 | Reason | 70/247 |
| 3,995,462 | 12/1976 | Boyle | 70/247 |
| 4,679,417 | 7/1987 | Van Cise, Jr. | 70/247 |
| 4,693,099 | 9/1987 | Cykman | 70/247 |
| 4,825,670 | 5/1989 | Snow | 70/247 X |
| 5,078,242 | 1/1992 | Ratke et al. | 70/248 X |
| 5,179,868 | 1/1993 | Thibeault | 70/248 X |
| 5,220,984 | 6/1993 | Ruiter | 70/248 X |
| 5,251,466 | 10/1993 | Chang | 70/247 |
| 5,263,345 | 11/1993 | Zagorac | 70/245 X |
| 5,289,907 | 3/1994 | Pattock | 70/248 X |

FOREIGN PATENT DOCUMENTS

| | | | |
|---|---|---|---|
| 0260007 | 3/1988 | European Pat. Off. . | |
| 2557050 | 6/1985 | France | 70/247 |
| 1012457 | 1/1986 | Japan | 70/248 |
| 331137 | 6/1930 | United Kingdom . | |
| 317055 | 9/1930 | United Kingdom . | |
| 1222040 | 2/1971 | United Kingdom . | |
| 1588427 | 4/1981 | United Kingdom . | |

*Primary Examiner*—Peter M. Cuomo
*Assistant Examiner*—Suzanne L. Dino
*Attorney, Agent, or Firm*—Rudnick & Wolfe

[57] ABSTRACT

A security device for an automobile having a floor pan that defines a lower surface of an operators compartment in the automobile. The security mechanism includes a key operated lock assembly that is securely mounted in the floor pan. A first end of the lock assembly is engagable with a manually operated key and is disposed to the interior of the drivers compartment while the second end of the lock assembly is disposed to the exterior of the drivers compartment. The lock assembly includes a locking member which moves between extended and retracted positions in response to manipulation of the key in the lock assembly. In a retracted position, the locking member is disposed to permit normal shifting and conditioning of a shiftable transmission of the automobile. When the key is manually manipulated in the lock assembly to move the locking member to an extended position, the locking member is operably coupled to an endwise moveable controller that conditions the transmission thereby preventing operation of the automobile.

5 Claims, 7 Drawing Sheets

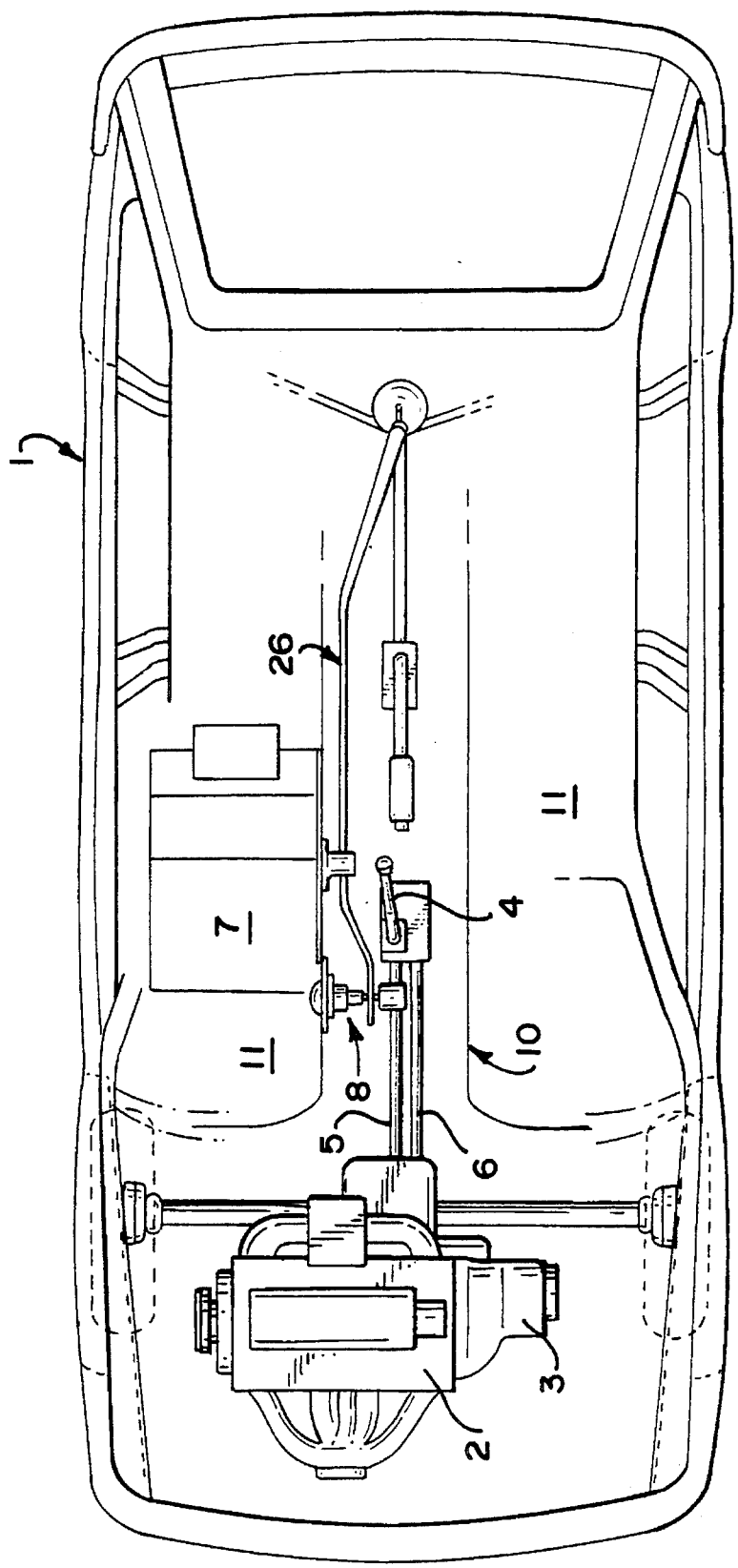

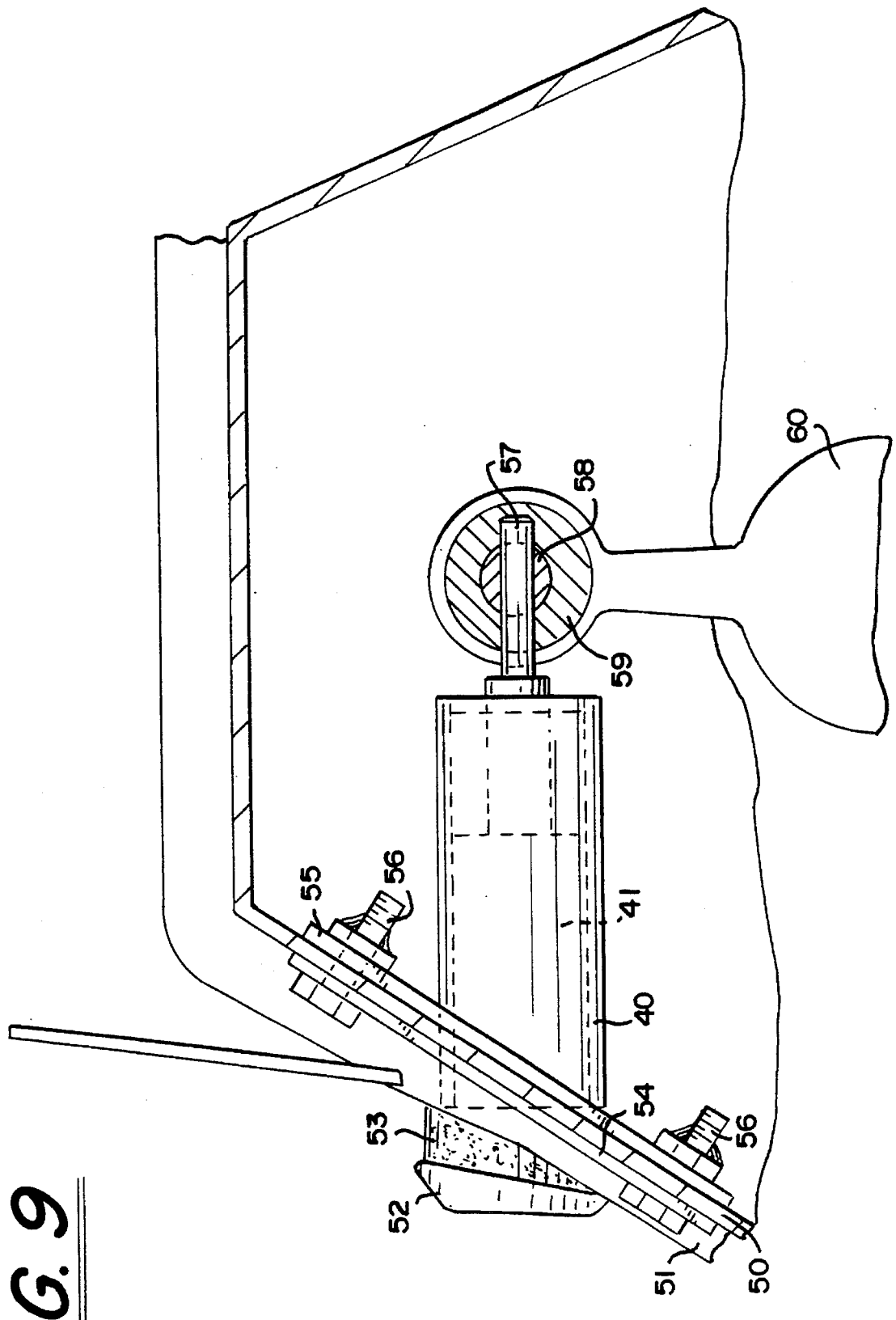

5,488,846

VEHICLE SECURITY DEVICE

FIELD OF THE INVENTION

The present invention relates to a security device for an automotive vehicle such as a car and which is intended to prevent a car thief from readily driving away the vehicle.

It is known to provide various lockable restraining or covering devices for application to various control devices within the driver/passenger compartment of an automotive vehicle so as to prevent or impede the unauthorized use of the vehicle. For example an adjustable bar, hooked at each end may be lockable between one of the vehicle pedals, eg the clutch or brake, and the steering wheel, or a device lockable between the gear lever and steering wheel or handbrake may be provided. Also, a device is known which may be locked over the release button of a handbrake lever to retain such in the operative braking position. Most if not all of the known devices can be relatively easily circumvented or removed.

It is an object of the present invention to provide a security device for automotive vehicles which cannot readily be overcome and a device whose main movement restraining component is located exteriorly of the drivers compartment in a region which is not readily accessible.

According to the present invention there is provided a security device for an automotive vehicle comprising lock means including a first end engagable by a key and a second operating end, mounting means for mounting the lock means beneath the floor pan forming the lower surface of the drivers compartment such that the first end extends through the floor pan to allow engagement by a key from the drivers compartment, securing means located beneath the floor pan exterior to the drivers compartment movable between a first operative position in which it prevents movement of the transmission shaft which extends between and is coupled to, at one end the gear lever which itself extends into the drivers compartment and at the other end the gear box, and a second inoperative position in which it allows movement of the transmission shaft, the operating end of the lock means being coupled to the securing means such that operation of the lock means by the key moves the securing means into its first position and locks it in the first position to prevent movement of the transmission shaft and the vehicle.

Preferably the mounting means for the lock means is arranged such that it lies beneath the floor pan so that it is inaccessible from the driver's compartment above the floor pan.

It will be appreciated that the inaccessibility of the securing means and the safe mounting of the lock means in or under the floor or transmission tunnel of the vehicle is of considerable advantage for security. Where reference to floor is made such will normally be regarded as relating to the "floor pan" as it is termed in modern vehicles, which includes the part defining a transmission tunnel or the gear box tunnel or engine tunnel region or like.

The mounting of the lock means provides for a very secure location which may be enhanced by provision of pressure distribution means such as a backing plate beneath the floor pan to prevent the lock means from being pulled out of the material, normally metal, of the floor pan or like. Sometimes a so called "sliding-hammer" may be used to pull a lock out of its support and in the screwing in of such a "sliding-hammer" extra pressure is exerted on the lock and disengaging means may be provided, such as a retaining member on a gear linkage lever engagable by a collar or like of the securing member, to disengage such securing member from the lock in the event of undue or abnormal pressure being provided on the lock.

Whilst the lock means will normally be a mechanical key operable device any otherwise controllable lock means may be provided in known manner as are currently becoming more common. For example, a magnetic key and magnetically controllable lock may be used or even an ultra sonic lock.

With a centrally mounted handbrake and gear lever an additional lever will be mounted on the bottom thereof and preferably in the normally inaccessible ratchet toothed segment thereof and extend to a position to be engagable together with a gear linkage rod or other gear control means to be engagable together by said securing member.

The invention is particularly suitable for front wheel drive transverse engine vehicles where a transmission shaft connects the gear lever with the gear box. However, it may be used on other vehicles and the securing means may even act on the gate or gear box components itself to restrict operation.

According to a preferred embodiment of the invention, a security device for an automotive vehicle comprises a housing having a through passage for slidably receiving a lock and having outwardly directed retaining projection means at one end to overly the interior surface of a vehicle floor pan which surface defines the aperture through which said housing extends, said lock having a keyhole at its end accessible from the interior of the vehicle and at its remote end has an extension member forming securing means extending out of said housing and being engagable with a transmission shaft or means mounted thereon in which it is required to retain transmission shaft and being engagable with an extension means connected to the handbrake system or acting to displace said extension means into engagement with the extension means so as to secure said handbrake in an operative braking position; said lock having a displaceable catch extendible to engage a recess in the said housing and retractable to disengage from said housing and biassing means to urge said extension member out of engagement with the selector rod and said lock towards the interior of the vehicle.

Preferably the extension means of the handbrake system is a rod or lever pivotally connected to the handbrake pulley or like member displaceable by the lever and is connected to said extension member of the lock and displaceable therewith and has means interengageable with cooperating means on the linkage rod or means thereof preferably over a range to allow for different positioning of the handbrake system and preferably a lost motion or sliding pivot interconnector is provided between the rod and the extension member of the lock, such as a pin sliding in a slot, to ensure said extension member with still engage with the linkage rod. Preferably the extension rod of the handbrake will be spring biassed in the same direction as is the lock. Preferably a pressure distribution plate or washer will be provided around the housing for the lock which latter will have a threaded portion extending in the region where the housing extends through the floor pan or tunnel or like part and receives a locating nut which acts against said pressure distribution member to hold the housing in position against being pulled out through the floor.

It is also envisaged that the security device of the present invention may also be utilised to impede the theft of car radios, tape/CD players and the like whereby a securing cable, chain, wire or rope or other flexible tractive member may be secured to the back of the electrical unit when in position in the dashboard and which securing operation requires considerable difficulty or at least dismantling part of the dashboard or a difficult manipulation operation at the not readily accessible back of the unit. The cable or like will extend with undue slack to the region of the securing member as hitherto mentioned and will have an aperture eg by way of a loop or by being connected to an apertured member through which said securing member is displaceable. Thus when the security device is locked the loop cannot be displaced sufficiently for this unit to be then able to be readily removed although when the security device is unlocked the loop or like may be displaced sufficiently for the unit to be then removed by a subsequent disengagement operation— as is known. Means actuable if said cable or like is out may be provided which act to prevent removal of the unit. The cable will be sufficiently stiff as to permit the loop or like to be pushed back for locking. Guides may be provided and a Bowden cable may even be used.

The device may be provided as a kit to modify existing vehicles or be incorporated in the construction of new vehicles.

BRIEF DESCRIPTION OF THE DRAWINGS

The invention will be described further, by way of example, with reference to the accompanying drawings, in which:

FIG. 1 is a schematic plan of a vehicle engine, gearbox and control lever of a front wheel drive, transverse engine vehicle illustrating the possible location of the security device;

FIG. 9 is a schematic section through a fourth embodiment according to the invention.

DESCRIPTION OF THE PREFERRED EMBODIMENTS

Figure 2A:
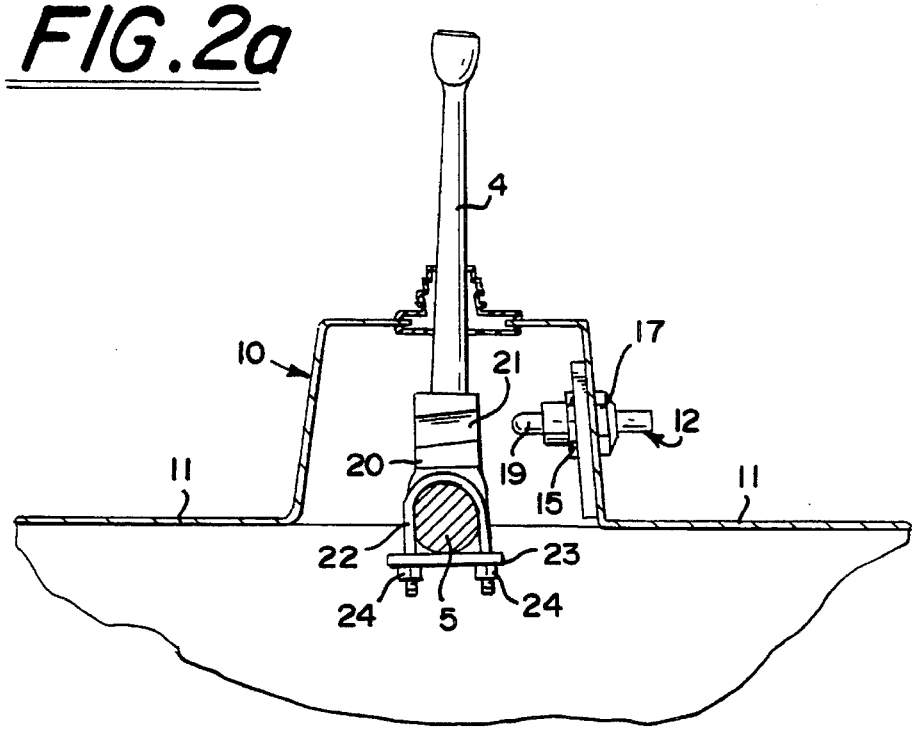
FIG. 2A is a schematic section through the tunnel/housing of a floor pan such might be used in the vehicle of FIG. 1 and showing the bottom of the gear lever and the locking device forming part of the security device.
Figure 2B:
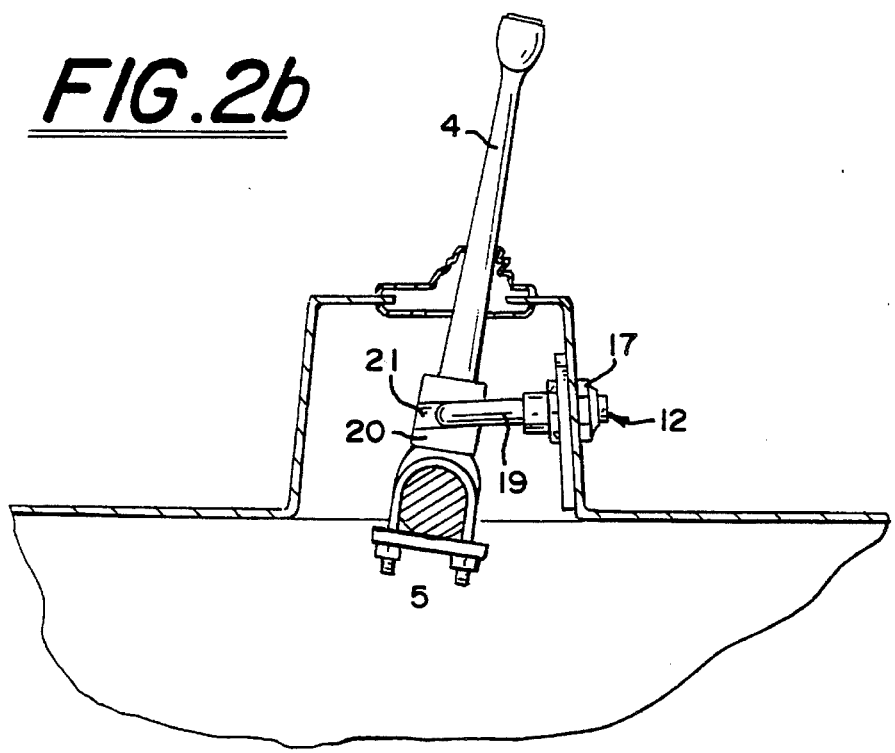
FIG. 2B is a schematic section similar to FIG. 2A illustrating the locking position of the security device according to the present invention.

In FIG. 1 a four wheeled vehicle 1 is schematically illustrated comprising a transverse engine 2 with gear box 3 controlled by gear lever 4 in the interior compartment of the vehicle via a remote control gear linkage rod 5. A gear box stabiliser rod 6 is provided connected to the engine in known manner. In the right hand drive vehicle illustrated the drivers seat is indicated as 7 and the security device of the present invention is indicated by reference numeral 8.

Generally the floor of a modern automotive vehicle is formed from pressed metal and is normally referred to as a floor pan and such will normally include a central raised portion (referred to as a tunnel or housing) under which lies the rear end of the gear box and which housing extends rearwardly as a transmission tunnel (not shown). In the front wheel drive transverse engine vehicle illustrated in FIG. 1 a similar housing portion 10 of floor plan 11 is provided along which the remote control gear linkage rod 5 extends from the bottom of the gear lever 4 to the gear box 3.

Figure 5:
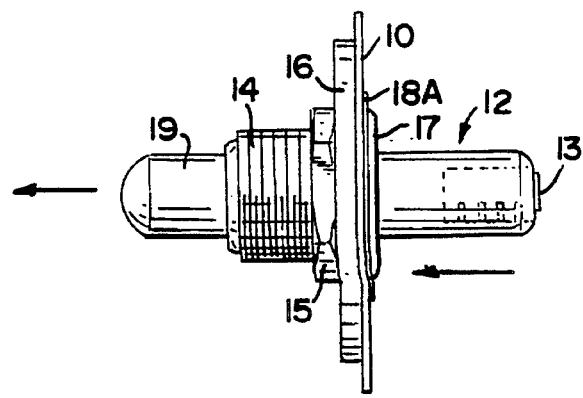
FIG. 5 is an enlarged fragmentary elevation showing the lock means and displaceable securing means mounted in the tunnel or housing of the floor pan of a vehicle.

A lock 12 having a keyhole at end 13 is mounted slidably displaceable in a housing 14 which extends through an aperture in housing 10 and is secured in position by means of a retaining nut 15 screw threadedly displaceable on a threaded outer portion of housing 14 to abut against a steel reinforcing plate 16 which acts as a pressure distribution means and abuts the exterior (or lower) face of housing 10 on the side adjacent the gear linkage rod 5. The housing has an outwardly directed flange or collar 17 which abuts the interior surface of the housing 10 relative to the vehicle compartment via the intermediary of a plastics material washer 18A and the shoulder or collar 17 is larger than the aperture which the housing 14 extends through. The lock 13 has a locking pin (not shown) in FIGS. 3 and 5 but similar to pin 18 in FIG. 5A which when the lock 12 is in the depressed position in housing 14 engages in an aperture in the housing 14 to securely retain the locking position.

The lock 12 has an extension 19 at the end remote from keyhole end 13. The extension 19 axially extends from and beyond the exterior end of housing 14 and is movable along a linear path of travel between retracted and extended positions. In its extended position, the extension 19 acts as a securing means when displaced into engagement with the linkage rod 5 or in the embodiment shown with an apertured member 20 securely located on rod 5.

Figure 4:
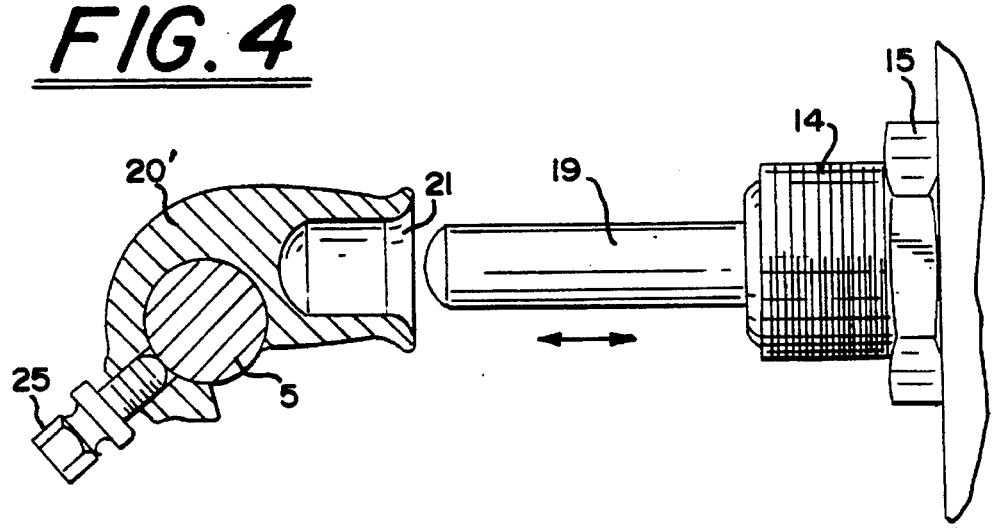
FIG. 4 is an enlarged elevational schematic detail illustrating the means mounting on the gear lever control linkage/rod for receiving the end of the securing member (deadbolt) which is displaceable with the lock means.

Apertured member 20 has aperture 21 for receiving the securing member 19 when the gear lever 4 is in the required position and the lock 12 is depressed. The apertured member sometimes referred to as the "female", will be securely mounted on linkage 5 e.g. by inverted U-shaped straps 22 with cross piece 23 and nuts 24 (FIG. 2a), which clamp the rod 5 and the nuts will be riveted or otherwise somehow secured against easy removal. A slight modification of the apertured member is illustrated in FIG. 4 which comprises a shaped member with recess for linkage 5 and two locking shear headed bolts 25 being provided. The device 20—may be provided with a suitable size of gap so as to be able to be fitted to geared linkage rods 5 of different diameters. In FIG. 4 a blind aperture 21 is provided and the end of securing member 19 is rounded to facilitate insertion.

The lock 12 may be any suitable kind such as a roller shutter bullet lock marketed under Trade Mark "Supreme" by Viro and such may be used in the subsequent embodiment also. See FIG. 6A also.

Figure 3:
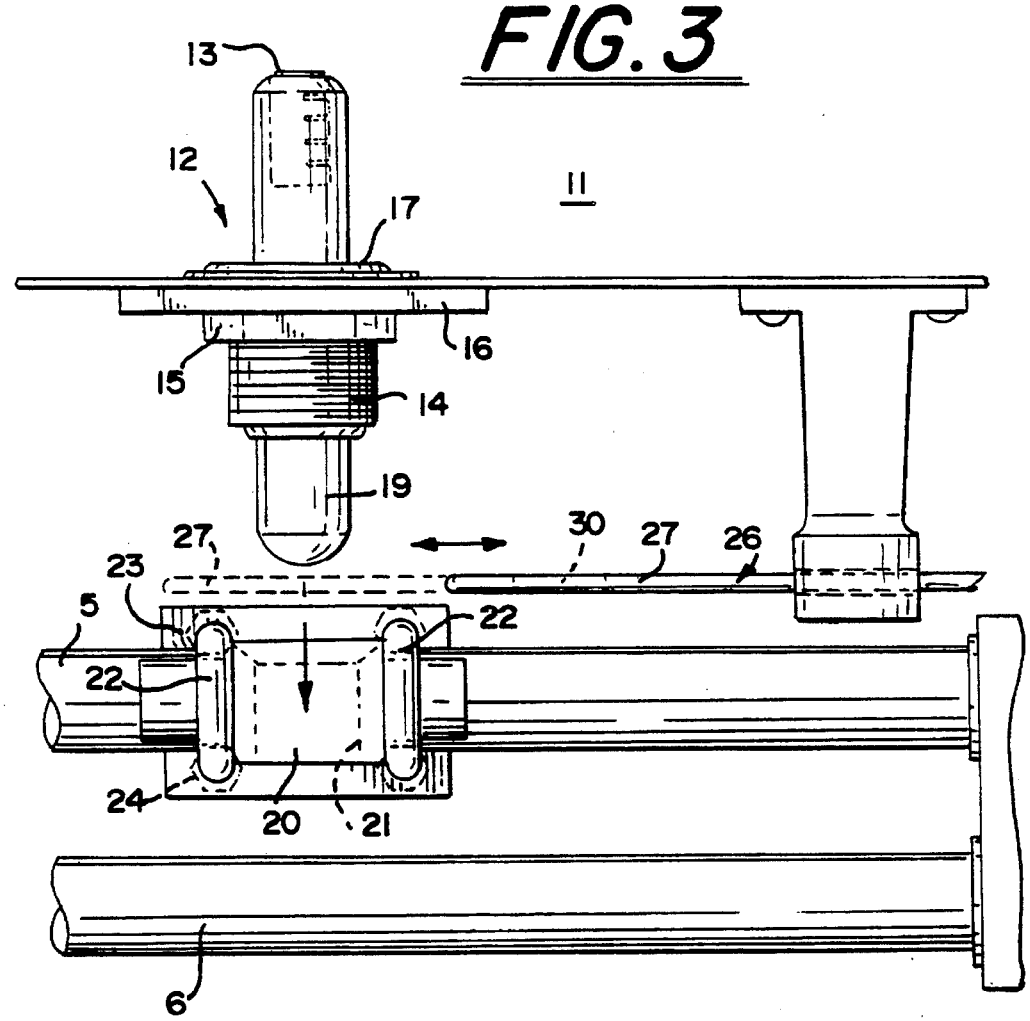
FIG. 3 is a schematic plan view illustrating a first embodiment of a security device according to the present invention.
Figure 7:
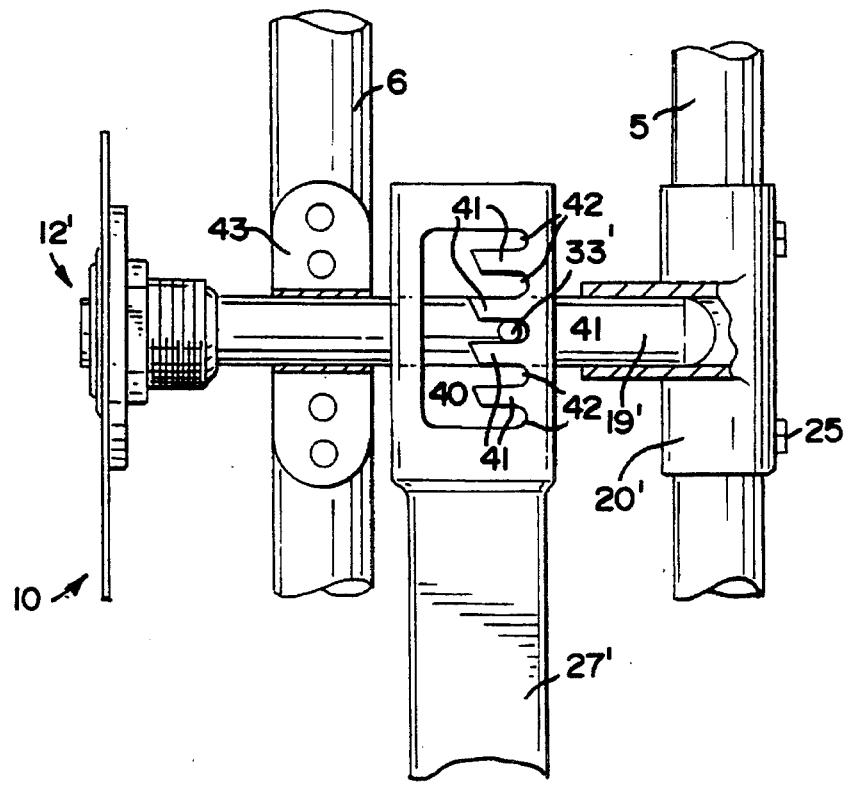
FIG. 7 is an enlarged fragmentary detail of a modification including reverse orientations of the embodiment of FIG. 6.

In FIG. 3 there is also schematically illustrated a means 26 for enabling the handbrake to be locked in the braking position although as shown in FIG. 3 such is in the "off position". The handbrake locking means 26 comprises a rod 27 pivotally mounted at one end 28 to the arcuate ratchet 29 normally provided at the bottom of the hand brake lever although may alternatively be mounted on the arcuate hand brake pulley (such as illustrated in FIG. 7) around which the rear brake wheel operating cables operate. In any event, rod 27 has an aperture 30 at its end remote from its mounting and is guided or otherwise mounted so as to be displaced in the operative position of the handbrake into a position whereby the securing member 19 of the lock 12, when depressed, passes through aperture 30 and into aperture 21 of the member 20 or 20'.

In the preferred embodiment, the receiving member 20 is mounted on the rod 5 in a position and disposition such that when shift lever 4 is moved to a reverse position, the aperture 21 in member 20 is aligned with the path movement of and is adapted to receive the securing member 19. When the handbrake of the vehicle is not applied, the rod 27 is removed from the path of travel of the securing member 19. In response to the application of the handbrake, the rod 27 moves to a second position, wherein the rod 27 lies in the path of travel and between the securing member 19 and the transmission shaft 5. With the handbrake fully applied, the aperture 30 in rod 27 is aligned with the path of travel of the securing member 19 such that the distended free end of the securing member 19 passes through the aperture 30 and into operative engagement with the transmission shaft 5 to lock the shift lever 4 against movement while concurrently applying a braking force to the vehicle.

Figure 6:
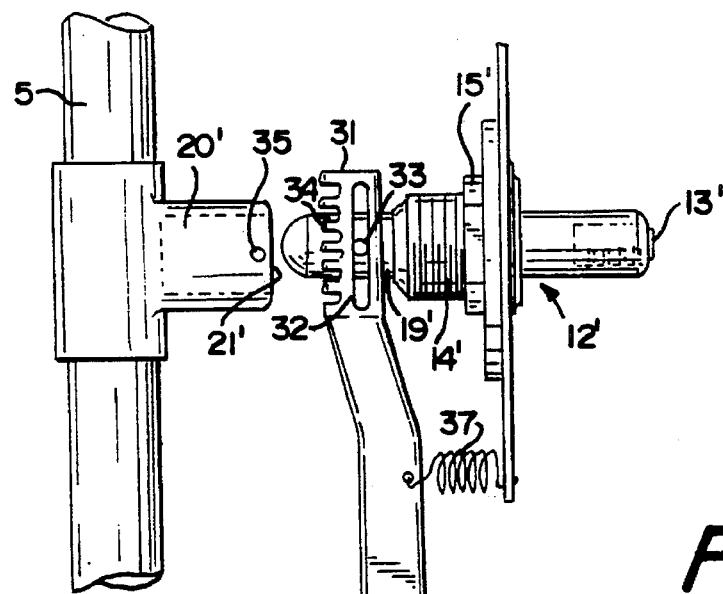
FIG. 6 is a schematic plan view of a second embodiment according to the invention wherein an improvement in the mounting of the extension member (hand brake rod) of the hand brake system is illustrated to permit interengagement of the components of the device in the locking position with the securing member being illustrated spaced apart from the slotted end of the rod.
Figure 6A:
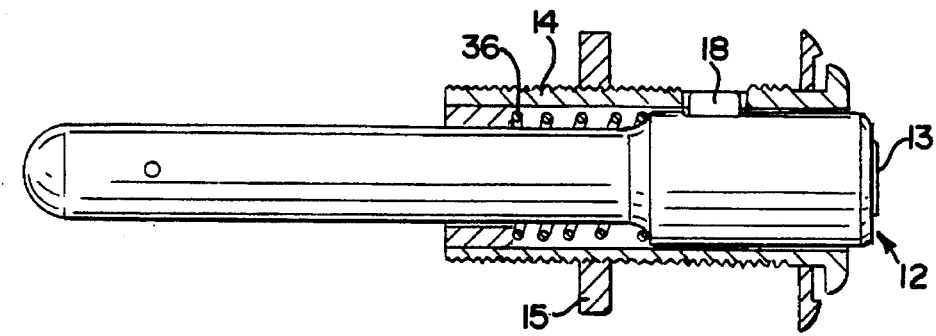
FIG. 6A is an enlarged detail of lock means 12, 13 and 18.

In the embodiment of;

FIG. 6, 6A and 7 the same reference numerals with prime are used to indicate the same or similar parts as in FIGS. 1–5 and the main difference in this embodiment resides in the mounting and interengagement securement of the handbrake rod 27'. Instead of a simple aperture 30 as shown in FIG. 3, the end 31 of rod 27' has an elongate slot 32 in which there is captively retained and displaceable both longitudinally and rotationally relative to rod 27' a mounting pin 33. In FIG. 6 only a single pin 33 is provided but the end of securing member 19' is shown separated from slot 32 for clarity. A plurality of teeth or castellations 34 are provided on one side of the end of rod 27' and the spaces therebetween are able to receive a connecting pin 35 mounted on the receiving member 20' when the rod 27' is displaced thereagainst by securing member 19' which in such movement also engages in recess 21' in member 20' to lock linkage rod 5 in the required position.

In FIG. 6A a return or bias spring 36 is illustrated in the housing 14 and biases the lock 12' so as to be displaced out of the housing 14' in the non-locking position. An additional return spring 37 is provided between the handbrake rod 27' and the housing portion 10 to additionally act to disengage the end of the rod 27' from pin 35 and thus additional security means or failsafe means are provided by the two springs 36, 37.

In this embodiment the other end of handbrake rod 27' is pivotally mounted at 28 to a conventional arcuate cable pulley part 38 of the handbrake system which acts on cables 38 which operate the rear brakes and which pulley member 38 is connected to the handbrake (not shown in detail). A "Supreme" lock such as made by Viro might be utilised as such are commonly used for purposes wherein a plunger or push in type locking effect is required.

As mentioned in the introduction, the security device may be used in combination with a cable or like flexible member securedly connected to the rear of an electrical music unit or like in the passenger compartment and connected and guided so as to be located in the region of the end of securing member 19 or 19' so as to be lockable in position in a similar manner to the end of the handbrake rod 26, 26'. Various other modifications or changes may be effected without departing from the scope of the present invention. The previously mentioned bullet lock may be of generally rectangular cross-section in known manner as may be the housing in which it is received although the outer surface of such housing may be cylindrical where the thread portion is to receive the locating nut.

In operation of the security device of the embodiments, the vehicle is placed in reverse gear as normal (gear selector control rod 5 will align aperture 21 of receiving member 20/21', 20' with securing member 19/19' of lock 12/12' the handbrake is applied firmly and rod 27/27' will move forward aligning hole 30 or the spaces with pin 35. Lock 12, 12' is then pushed into its locking position in housing 14, 14' so that securing member 19, 19' passes through aperture 30 or engages pin 35 with teeth 34 and the end of securing member 19, 19' engages in recess 21, 21' so that the vehicle is retained in the reverse drive position and the handbrake in the braking position is retained in such position. The lock will probably be such as to automatically lock. To release the device the key (not shown) is simply inserted and turned and the lock 12 would then spring out thus releasing the handbrake and gear linkage rod so that the vehicle may be driven as normal.

FIG. 6A is an enlarged detail of lock means 12, 13, 14, 18.

FIG. 7 is an enlarged fragmentary detail of a modification of the embodiment of FIG. 6 but with opposite mounting and wherein the end of handbrake.rod 27' is modified so as to have an aperture 40 into which teeth 41 extend and are engagable by a pin 33' on member 19' in the locking position, of lock 12'. In the non-locked position the pin 33' extends into the clear space of aperture 40 so as to permit the end of rod 27' to be freely displaced relative thereto. The free end of securing member 19' in the locking position, engages an apertured member 20' securely mounted on rod 5 via suitable means. In the embodiments shown in FIG. 7, when the free end of securing member 19' is in an extended or locking position, the pin 33' is releasably accommodated in one of the spaces or slots 42 defined between adjacent teeth 41 on the handbrake rod 27' thereby the rod 27' and transmission shaft 5 are interlocked in position.

In the modification of FIG. 7, the lock 12' is mounted on the opposite side of the tunnel compared to that of FIG. 6 and the bolt or securing member is longer and slidably extends through a support bracket or other guide 43 securely mounted on the gear box stabilizer bar 6. The bracket adds additional strength and assists in angling of the lock in installation and in securement.

The security device is suitable for mounting on Ford models XR3, Escort and Fiesta and on other cars.

As an additional security, it is envisaged that a metal plate or like shield member may be riveted or otherwise fixed to the outside of the vehicle floor extending across the mouth of the tunnel ie beneath where the security device is secured device being tampered with.

The security device may be located in the region of a driver's calf or ankle.

For vehicles having a gearbox stabilizer bar (such as bar 6 in FIG. 3), the lock means and in particular the housing of the lock means may be located in an aperture in the floor and/or transmission tunnel of a vehicle but actually secured to said stabilizer bar preferably by being securely located in an aperture in a carrier member or plate which plate has holes or other means enabling such plate to be mounted on the stabilizer bar to hold the housing in position. Cooperating means for receiving the securing member in its operative position are provided preferably in the form of a sleeve into which the securing means is displaceable in the operative position. The cooperating means/sleeve is mountable in the gear stick control linkage and preferably has an engine or ignition inhibitor switch operable by the securing member to prevent the engine from being started. The inhibitor switch is preferably spring biassed into the closed position so that when the securing member is withdrawn from the sleeve the engine may be started.

Figure 8:
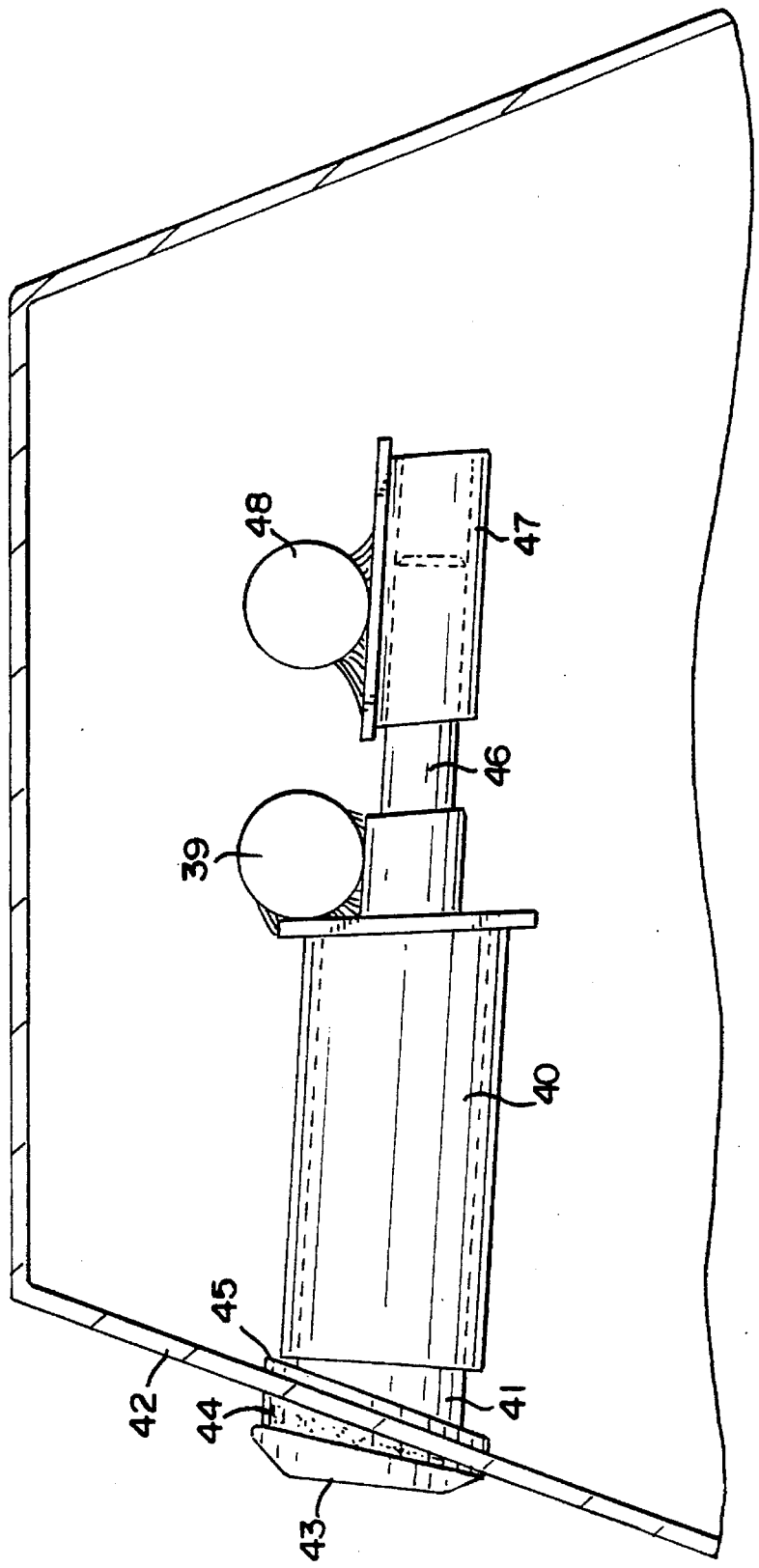
FIG. 8 is a schematic section through a third embodiment according to the invention.

FIG. 8 illustrates a third embodiment of the invention which utilises a fixed stabilizer bar or shaft 39 similar to the fixed bar 6 described above. Here, the fixed stabilizer shaft 39 has welded to it a cylindrical fixing bracket 40. The fixing bracket holds within it the main body 41 of a barrel lock. This barrel lock extends through an aperture (not shown) in the transmission tunnel 42 of a vehicle and has an embellishing ring 43 mounted at its exterior end. A high density foam seating washer 44 lies between the tunnel surface and the embellishing ring 43. A rubber grommet 45 lies on the interior surface of the transmission tunnel 42. The barrel lock 41 operates by extending a deadlock bolt 46 through a bolt receiver 47 welded upon the moving selector shaft 48 of the vehicle. This embodiment is of particular use for immobilizing a front wheel drive vehicle. It is one where there is no operation on the brake system of the vehicle.

FIG. 9 illustrates the fourth embodiment of the invention which similarly acts only on the transmission system of the vehicle and not on the brake system. Here, the system is of particular use for a rear wheel drive vehicle. Here, a fixing bracket 40 mounts within it the main body 41 of a barrel lock. The barrel lock 41 is arranged to extend through the floor 50 of the transmission tunnel. As is usual with most motor vehicles, the transmission tunnel surface is covered by carpeting 51. This helps to mask the lock to ensure that it does not stand out to a potential thief. An embellishing ring 52 lies at its outer end and a high density foam washer 53 lies behind the embellishing ring.

An outer plate 54 and mounting bracket plate 55 lie on opposite surfaces of the transmission tunnel 50 and are bolted together by two bolts 56. The deadlock bolt 57 of the lock assembly extends through the linkage rod 58 and its housing 59. Holes have been drilled through both the shaft 58 and the housing 59 to allow the bolt 57 to pass through. When in its position illustrated in FIG. 9, the linkage rod 58 cannot move to select a gear at the gearbox illustrated generally at 60.

Thus, a special bracket does not have to be welded onto the linkage rod in order for the lock to operate, the bolt can pass through the linkage rod itself.

I claim:

1. A key operated security mechanism for an automobile having an engine, a handbrake including a normally inaccessible ratchet tooth portion, a floor pan defining a lower surface of a drivers compartment, a movable shaft assembly extending outside of the drivers compartment for generally endwise linear movement in opposite directions along a predetermined path of travel and below the floor pan, said shaft assembly being connected to a transmission of the automobile for controlling the operating condition of the transmission as a function of the linear position of the shaft assembly, a shift lever which extends from the drivers compartment through the floor pan and is coupled to selectively move the shaft assembly and thereby condition the transmission, said security mechanism comprising:

a lock assembly having a first end engagable by a key and a second operating end, said lock assembly including an apparatus for mounting the lock assembly to the floor pan such that the first end of said lock assembly extends to an interior of the drivers compartment to allow engagement thereof by said key from the drivers compartment and with the second end of said lock assembly extending to an exterior of the drivers compartment, said lock assembly further including a linearly distendable locking member slidably extending from the mounting apparatus and beyond said housing at the second end of said lock assembly beneath the floor pan outside of the drivers compartment, a free end of said locking member being movable between retracted and extended positions relative to said mounting apparatus and in response to manual manipulation of said key in said lock assembly, and wherein when said locking member is in said retracted position said shaft assembly is free to move endwise under the influence of said shift lever whereas when said locking member is in said extended position and said shift lever moves the shaft assembly to condition said transmission into a predetermined condition said locking member extends into the path of travel of the shaft assembly to prevent endwise movements of the shaft assembly in either linear direction thereby preventing the shift lever from moving and conditioning the transmission into another condition, and wherein said lock assembly further includes a lever mounted on said handbrake and engagable with the normally inaccessible ratchet toothed portion on the handbrake, and wherein said lever is mounted for movement between a first position, whereat the lever is disposed remote from the path of movement of the locking member on the lock assembly, to a second position, whereat the lever lies in the path of movement of and engages with the locking member on the lock assembly to secure the handbrake in an operative braking position.

2. A key operated security mechanism for an automobile having an engine, a handbrake system including a handbrake, a floor pan defining a lower surface of a drivers compartment, a movable shaft assembly extending outside of the drivers compartment for generally endwise linear movement in opposite directions along a predetermined path of travel and below the floor pan, said shaft assembly being connected to a transmission of the automobile for controlling the operating condition of the transmission as a function of the linear position of the shaft assembly, a shift lever which extends from the drivers compartment through the floor pan and is coupled to selectively move the shaft assembly and thereby condition the transmission, said security mechanism comprising:

a lock assembly having a first end engagable by a key and a second operating end, said lock assembly including an apparatus for mounting the lock assembly to the floor pan such that the first end of said lock assembly extends to an interior of the drivers compartment to allow engagement thereof by said key from the drivers compartment and with the second end of said lock assembly extending to an exterior of the drivers compartment, wherein the mounting apparatus of said lock assembly comprises a housing having an outwardly directed retaining portion at one end for overlying an interior surface of said floor pan, said lock assembly further including a linearly distendable locking member slidably extending from the mounting apparatus and beyond said housing at the second end of said lock assembly beneath the floor pan outside of the drivers compartment, a free end of said locking member being movable between retracted and extended positions relative to said mounting apparatus and in response to manual manipulation of said key in said lock assembly, and wherein when said locking member is in said retracted position said shaft assembly is free to move endwise under the influence of said shift lever whereas when said locking member is in said extended position and said shift lever moves the shaft assembly to condition said transmission into a predetermined condition said locking member extends into the path of travel of the shaft assembly to prevent endwise movements of the shaft assembly in either linear direction thereby preventing the shift lever from moving and conditioning the transmission into another condition, and wherein said lock assembly further includes an extension connected and responsive to the handbrake system on the automobile, said extension being engagable by the locking member of the locking assembly to secure the handbrake of the handbrake system in an operative braking position and thereby inhibit movement of the automobile.

3. The key operated security mechanism according to claim 2 wherein said handbrake system includes a handbrake pulley member pivotally connected to a rod forming part of said extension, said rod also being connected to the locking member of said lock assembly and is displaceable therewith, said rod being operably coupled to said shaft assembly preferably over a range of movements to allow for different positioning of the handbrake system.

4. The security mechanism according to claim 3 further including a spring for biasing said extension connected to the handbrake system away from engagement with said shaft.

5. A manually key operated security mechanism for an automobile having a floor pan defining a lower surface of a drivers compartment, a handbrake, a movable shaft extending outside of the drivers compartment below the floor pan for generally endwise movement, with the linear position of the shaft determining the operating condition of a transmission of the automobile, and a shift lever accessible from the drivers compartment for endwise positioning the shaft and thereby selectively conditioning the transmission for operating the automobile, said security mechanism comprising:

a lock assembly having a first end that is engagable by a key and a second end, said lock assembly including a housing that secures said lock assembly to and extends through the floor pan such that the first end of the lock assembly is disposed to an interior of the drivers compartment and with the second end of said lock assembly being disposed to an exterior of the drivers compartment, said lock assembly further including a linearly distendable locking member that extends axially from the second end of the lock assembly and is slidably mounted for telescoping movements relative to said housing between retracted and extended positions in response to manual manipulation of the key in said lock assembly;

a coupling secured in a predetermined position along the length of said shaft, said coupling being configured to releasably receive a free end of said locking member after said transmission has been conditioned into a predetermined condition and said key is manually operated to move the locking member to an extended position thereby preventing the shift lever from further conditioning the transmission until the locking member is moved to a retracted position in response to manipulation of the key in the lock assembly; and wherein said lock assembly further includes a lever that moves in response to movement of the handbrake, said lever being movable between a first position, when the handbrake is released, and a second position, when the handbrake is applied, and wherein said lever is configured to be releasably connected to said coupling when said lever is in said second position thereby coupling the handbrake to the shaft to inhibit further movement of the automobile.

\* \* \* \* \*